United States Patent [19]
Kurka

[11] 3,923,739
[45] Dec. 2, 1975

[54] LINEAR β-HYDROXY-ESTER, β-HYDROXY-ETHER AND β-HYDROXY-AMINE POLYMERS

[75] Inventor: Kurt A. Kurka, Shoreview, Minn.

[73] Assignee: Minnesota Mining and Manufacturing Company, St. Paul, Minn.

[22] Filed: July 21, 1971

[21] Appl. No.: 164,956

Related U.S. Application Data

[63] Continuation-in-part of Ser. No. 802,264, Feb. 25, 1969, abandoned.

[52] U.S. Cl..... 260/47 EP; 260/47 EC; 260/47 EN; 260/75 NK; 260/75 EP; 260/78.4 EP; 260/824 R; 260/830 R; 260/831; 260/835; 117/161 K; 117/161 ZB; 161/184
[51] Int. Cl.$^2$ .............. C08G 63/20; C08G 63/46; C08G 65/00; C08G 73/00
[58] Field of Search .... 260/78.4 EP, 75 EP, 75 NH, 260/78 EP, 47 EP, 830, 835, 837, 2 EP, 348 R, 348 C

[56] References Cited
UNITED STATES PATENTS

| | | | |
|---|---|---|---|
| 3,336,257 | 8/1967 | Alvey | 260/47 |
| 3,395,128 | 7/1968 | Hale et al. | 260/77.5 |
| 3,438,849 | 4/1969 | Isack | 161/170 |
| 3,548,026 | 12/1970 | Weisfeld et al. | 260/835 |
| 3,576,781 | 4/1971 | Hicks | 260/32.8 |

*Primary Examiner*—Joseph L. Schofer
*Assistant Examiner*—John Kight, III
*Attorney, Agent, or Firm*—Alexander, Sell, Steldt & DeLaHunt

[57] ABSTRACT

Thermoplastic, flexible linear polymer of moderately high molecular weight containing recurring β-hydroxy-ester, β-hydroxy-ether and/or β-hydroxy-amine linkages in its skeletal chain, primarily useful in various electrical insulating applications.

7 Claims, No Drawings

LINEAR β HYDROXY-ESTER, β HYDROXY-ETHER AND β HYDROXY-AMINE POLYMERS

CROSS-REFERENCE TO RELATED APPLICATION

This application is a continuation-in-part of my co-pending application Ser. No. 802,264, filed Feb. 25, 1969, now abandoned.

FIELD OF THE INVENTION

This invention is primarily concerned with flexible electrical insulating resins, e.g., polymers of moderately high molecular weight which may be prepared from diepoxides such as are obtained by condensing epichlorohydrin with 2,2-bis(4-hydroxyphenyl)pentane (i.e., bisphenol A).

BACKGROUND OF THE INVENTION

Electrical insulating resins usually must be flexible and tough in order to resist mechanical and thermal shocks to which they may be subjected in use. However, with the exception of silicone resins which are very expensive, flexible-type electrical insulating resins generally do not exhibit good resistance to prolonged exposure to high temperatures. The best reasonably-priced resin in this respect of which I am aware is disclosed in Kurka-Bond U.S. Patent No. 3,027,279, but further improvement has been a widespread goal.

Alvey U.S. Pat. No. 3,336,257 primarily concerns polymers of the type presently marketed by Union Carbide Corporation as "Phenoxy" resins. Phenoxy-type polymers have a similarity to polymers of the present invention in that they have rather high molecular weight while still being soluble and fusible, but Phenoxy-type polymers are not primarily aliphatic. For this reason and because they possess rather short chains between adjacent hydroxyl groups, they are far less flexible than are the products of the present invention. For example, when a film of Phenoxy-type resin is stretched, it essentially does not retract, whereas films of the present invention exhibit good retractability. In the Alvey patent there is one suggestion that would lead to a polymer having recurring β-hydroxy-ester, β-hydroxy-ether or β-hydroxy-amine linkages in its skeletal chain, segments of which would include at least 20 members between adjacent hydroxyl groups as defined hereinbelow. That suggestion is found at column 6, lines 6–7. However, when that suggestion was followed, a gel was encountered before a polymer like that of the present invention could be obtained.

SUMMARY OF THE INVENTION

Flexible-type resins which afford good electrical insulating properties and retain their flexibility in spite of long exposure to high temperatures are provided in the present invention by a linear polymer having recurring β-hydroxy-ester, β-hydroxy-ether and/or β-hydroxy-amine linkages in its skeletal chain. To realize the good long-term heat resistance, the skeletal chain of the linear polymer should be substantially free from ethylenic unsaturation. For the same reason, substantially all of the ether oxygens, if any, in the skeletal chain should be attached to cyclic carbon.

To attain the desired flexibility, some segments of the skeletal chain between adjacent hydroxyl groups should have about 20 or more members, preferably more than 30 members, counting as one member each ring and each atom of any linear chain in the segment and excluding the carbons to which the hydroxyls are attached. For example, a cycloaliphatic ring, an ether oxygen and a sulfide would each count one member.

The novel linear polymer has a hydroxyl number of 25–250 and an inherent viscosity of at least 0.2, preferably more than 0.3, measured at a concentration of 0.5% by weight of the polymer in dimethyl formamide or methylene dichloride, although the high volatility of the latter makes it difficult to use. The linear polymer should be substantially free from oxirane oxygen and active hydrogen other than in its hydroxyl groups. It may contain secondary amide groups, inasmuch as the hydrogen of the secondary amide group is essentially not active.

The linear polymer should be primarily aliphatic (open-chain aliphatic) in order that products of the present invention may be desirably flexible. When more than one-half of the total carbon atoms in the polymer are aliphatic carbon atoms, exclusive of cycloaliphatic carbon atoms which are included in the total, the polymer is considered primarily aliphatic.

The linear polymer of the present invention is conveniently obtained by one of three routes. Each route employs an epoxide having an average of 1.9 to 2.0 terminal oxirane groups per molecule (or per average molecular weight) selected from glycidyl ethers and cycloaliphatic epoxides. One route involves interacting approximately equivalent amounts of the epoxide and a dicarboxylic acid which has a chain of at least 20 members between its carboxyl groups. A second route involves interacting approximately equivalent amounts of the epoxide and an amine having two active hydrogens, i.e., a secondary diamine or a primary monoamine, which amine has a chain of at least 20 members between its amino groups. In the third route, a dicarboxylic acid having a chain of at least 20 members between its carboxyl groups is reacted with a stoichiometric excess of the epoxide to provide an epoxy-terminated prepolymer of moderately low molecular weight having 1.9 to 2.0 terminal oxirane groups per average molecular weight. By interacting approximately equivalent amounts of this epoxy-terminated pre-polymer and a dicarboxylic acid, a dihydric phenol or an amine having two active hydrogens, a polymer of the present invention may be obtained.

To summarize these three routes, the linear polymer of the present invention may be obtained by interacting approximately equivalent amounts of (1) a glycidyl ether or cycloaliphatic epoxide having 1.9 to 2.0 terminal oxirane groups per average molecular weight and (2) a dicarboxylic acid, a dihydric phenol or an amine having two active hydrogens. At least one of said epoxide, dicarboxylic acid and amine should have a chain between its reactive groups of at least 20 members, and more than half of the total carbon atoms of the reactants should be aliphatic in order to provide a primarily aliphatic linear polymer. Useful dicarboxylic acids having chains of at least 20 members are acid-terminated long-chain hydrocarbons and acid-terminated linear polyesters, polyamides and mixed ester-amides. Useful amines having chains of at least 20 members are amine-terminated linear polyamides and long-chain hydrocarbons.

Aliphatic and cycloaliphatic amines will react with the epoxide at room temperature, but the mixture is preferably heated gently to about 40°–80°C to initiate the reaction. Aromatic amines and dihydric phenols may be heated to about 100°–150°C, and the acids may be heated to about 120°–200°C for reasonably fast reaction with the epoxide. The functional groups of both the epoxide and the dicarboxylic acid, dihydric phenol or amine should largely interact, as evidenced by the fact that each of the epoxide equivalent weight and, where applicable, the acid equivalent weight, the phenolic hydroxyl equivalent weight and the amine equivalent weight should exceed 15,000. Inert solvents are preferably, but not necessarily, employed to make stirring easier.

The epoxide may be a diglycidyl ether of a diphenol or a glycol. For example, the epoxide may be a specific compound such as diglycidyl ether or it may be a polymer, such as one obtained by condensing epichlorohydrin with bisphenol A. Such condensation products, which are called "epoxy resins", often have less than 2.0 oxirane groups per average molecular weight, but for use in the present invention, should not have less than about 1.9 on the average. A typical epoxide of this type which has demonstrated utility in the present invention has an epoxide equivalent of about 660 and a little less than 2.0 oxirane groups per average molecular weight, e.g., "Araldite 7072". Among other useful epoxides are cycloaliphatic diepoxides such as 1-epoxyethyl-3,4-epoxycyclohexane having the structure

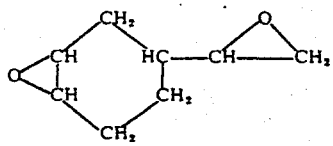

bis(2,3-epoxy-cyclopentyl)ether which has the structure

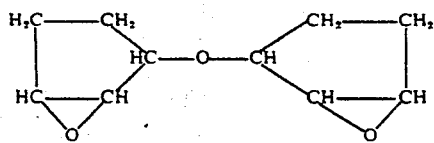

and 2-(3,4-epoxy)cyclohexyl 5,5-spiro(3,4-epoxy)cyclohexane-m-dioxane having the structure

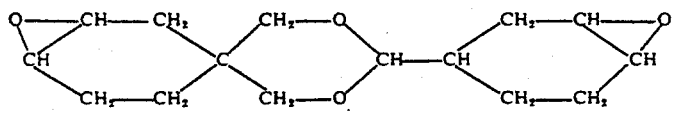

which is sold in commerce as "Araldite CY 174". Another cycloaliphatic epoxide which has been used is (3,4-epoxy)cyclohexylmethyl-3,4-epoxy cyclohexane carboxylate. Also useful are the diglycidyl ether of butanediol-1,4, the diglycidyl ether of resorcinol, the diglycidyl ether of bisphenol S [bis(4-hydroxyphenyl)-sulfone] and diglycidyl ethers of the aforementioned diphenols having bromine or chlorine substituents for flame retardancy. Representative commercial embodiments of each of the aforementioned diglycidyl ethers are available having very close to 2.0 oxirane groups per average molecular weight.

The linear polymer may be prepared stepwise. For example, excess epoxide may be copolymerized with a dicarboxylic acid to provide an epoxy-terminated pre-polymer which in turn is interacted with an amine having two active hydrogens to provide a linear polymer of the present invention having both β-hydroxy-ester and β-hydroxy-amine linkages in its skeletal chain. Alternatively, the epoxy-terminated pre-polymer may be interacted with dihydric phenol to provide a linear polymer having both β-hydroxy-ester and β-hydroxy-ether linkages, or it may be interacted with additional dicarboxylic acid to provide a linear β-hydroxy-ester polymer of the present invention.

Reaction between the epoxide and a dicarboxylic acid or a dihydric phenol is expedited by the use of a catalyst in amount between 0.01 and 3% by weight of the reactants. For the dicarboxylic acid, alkali metal salts of organic acids are preferred. A number of other catalysts have also been used, including tertiary amines, organo-substituted phosphines, and alkaline earth or alkali metal salts of phenols or organic or inorganic organic acids. The tertiary amines are preferred catalysts for reaction between the epoxide and a dihydric phenol. Generally no catalyst is needed or used when reacting an amine with the epoxide to produce a linear β-hydroxy-amine polymer of the present invention.

The linear polymer may be either amorphous or crystalline. Films of the latter have been oriented by stretching to provide tapes of exceedingly high tensile strength, while retaining a useful, albeit lesser, degree of flexibility and stretchability. When an oriented film is employed as electrical insulation, subsequent exposure to temperatures above the second order transition temperature results in loss of the orientation.

Initially the linear polymer may have a consistency from a viscous liquid to a hard solid which is fusible and soluble in common organic solvents such as acetone, toluene, xylene or methyl ethyl ketone. In order to develop optimum resistance to high temperatures, the linear polymer should be crosslinked through its hydroxyl groups. When the polymer has an appreciable number of β-hydroxy-amine linkages and has more unreacted epoxy groups than unreacted hydrogen-containing amine groups, it slowly crosslinks autogenously at room temperature. Where the reverse relationship exists between the unreacted epoxy groups and hydrogen-containing amine groups, the same effect occurs if sufficient polyepoxide is added to provide an overall excess of unreacted epoxy groups. However, if the linear β-hydroxy-amine polymer was made from a strongly basic amine, crosslinking proceeds at room temperature even if there is no excess of unreacted epoxy groups. Nevertheless, mild heating is generally employed to consummate the crosslinking of a linear β-hydroxy-amine polymer within a reasonably short time.

A linear polymer containing only β-hydroxy-ester and/or β-hydroxy-ether linkages may gradually become crosslinked upon prolonged heating at about 150°C or higher, but crosslinking is greatly expedited in the presence of a polyfunctional crosslinking agent having two or more groups reactive with hydroxyl. Preferred crosslinking agents are: (1) polyepoxides, provided that an epoxy-hydroxyl reaction catalyst such as stannic chloride or boron trifluoride is present, (2) polyisocyanates such as toluene diisocyanate and methylcyclohexylene diisocyanate, (3) phenol-formaldehyde, urea-formaldehyde and melamine-formaldehyde resins, (4) polyalkoxy silane resins such as dimethoxydimethyl silane, dimethoxydiphenyl silane and trimethoxy silane, and (5) aziridine derivatives such as tris-(1-aziridinyl)-phosphine oxide. The same crosslinking agents can be used with the linear β-hydroxy-amine polymers, except that no catalyst would be used with a polyepoxide. The amount of crosslinking agent used may vary widely up to an amount sufficient to provide one group reactive with hydroxyl for every hydroxyl group of the linear polymer, but smaller amounts are generally employed where the polymer should continue to be highly flexible.

For most electrical insulating uses, the linear polymer is employed in its fusible, soluble form and then is crosslinked before exposure to conditions of use, since the crosslinking greatly enhances resistance to adverse environmental conditions, e.g., heat and solvents. However, where the linear polymer is to be used as a film backing for an adhesive tape such as a pressure-sensitive adhesive tape, it is usually crosslinked in the course of preparation of the film in order to provide adequate strength and toughness to withstand the tape-making operation. On the other hand, a film of the linear polymer which has been oriented by stretching would not need to be crosslinked for this purpose.

In general, the greatest toughness and strength are provided by the linear β-hydroxy-amine polymers, and the β-hydroxy-ester polymers are superior in this respect to the β-hydroxy-ether polymers. On the other hand, the latter provide better hydrolytic stability if free or substantially free from ester groups in the skeletal chain.

The linear polymer may be modified by reaction with a monofunctional compound having a single group such as one of the functional groups possessed by the above-enumerated classes of crosslinking agents. Such modification may entail reaction of all of the hydroxyl groups of the linear polymer if a permanently fusible and soluble product is desired. On the other hand, a number of the hydroxyl groups on the linear polymer may be left unreacted, permitting it to be crosslinked. Among various reasons for monofunctional modification is the imparting of fire-retardancy by reacting the linear polymer with a monofunctional compound containing fire-retardant substances, such as halogen groups. In another instance, a linear β-hydroxy-ester polymer was reacted with a long-chain monofunctional compound, specifically octadecylisocyanate, in order to provide greater flexibility.

EXAMPLE 1

A mixture of 498.6 grams (6 equivalents) of isophthalic acid, 292 grams (4 equivalents) of adipic acid, 918.9 grams (9 equivalents) of 2,2-dimethyl-3-hydroxypropyl-2,2-dimethyl-3-hydroxypropionate (e.g., "Esterdiol 204") and 0.85 gram potassium acetate was slowly heated with stirring to 215°C while removing water of condensation. After 99% of the theoretical amount of water was removed, a vacuum was applied to strip out remaining volatiles. The resultant polyester had an acid equivalent weight of 1193.

1193 grams of this polyester was reacted at 180°C for 12 hours with 175 grams of a diepoxide (a diglycidyl ether of bisphenol A having an epoxide equivalent weight of about 175, e.g., Dow "DER 332") to provide a linear β-hydroxyester polymer having a calculated average of 98 members (as defined above) between adjacent hydroxyl groups in segments of the skeletal chain derived from the polyester. This product had a hydroxyl number of 56 and an inherent viscosity in dimethyl formamide of 0.32.

An 80% solution of the linear polymer in xylene was diluted to 65% solids with methyl ethyl ketone. 154 grams of the solution was mixed with 10 grams of methylcyclohexylenediisocyanate as a crosslinking agent, and the mixture was coated on a low-adhesion carrier web. This was heated at 65°C for 5 minutes and then at 200°C for an additional 5 minutes to provide a 7 mil thick crosslinked film product which was insoluble in acetone.

Some of the crosslinked film was stripped from the carrier web and subjected to various tests. In one set of tests, ½ inch wide strips of the film were tested in an Instron Tensile Tester at a jaw spacing of 1 inch and a rate of separation of 2 inches per minute, both before and after exposure to conditions indicated with the following data:

| Conditions | Tensile Strength (psi) | Elongation at Break |
|---|---|---|
| Film as prepared | 4640 | 346% |
| After 2 weeks in a circulating air oven at 200°C | 4200 | 320% |
| After 24 hours exposure to 10 psig steam pressure at 113°C | 3140 | 195% |

For a highly flexible, stretchable and retractable film, these results indicate remarkably good stability to severe environmental conditions. By way of comparison, a biaxially oriented film of polyethylene terephthalate disintegrates to brittle opaque flakes after exposure to 10 pounds steam pressure at 113°C for 24 hours.

Another portion of the crosslinked film was tested as electrical insulation, both before and after two weeks in a circulating air oven at 200°C. The test specimens were first conditioned overnight at 23°C and 50% relative humidity and then tested at 23°C for electrical insulating properties at 100 cycles per second. The temperature was then raised to and levelled off for testing at successively higher temperatures, a procedure requiring about 4 hours to complete. Results were as follows:

| Test Temp. | Dielectric Constant | | Dissipation Factor | |
|---|---|---|---|---|
| | Film as prepared | After 2 weeks at 200°C | Film as prepared | After 2 weeks at 200°C |
| 23°C | 4.4 | 4.3 | .069 | .079 |
| 60°C | 6.4 | 6.1 | .068 | .034 |
| 90°C | 6.5 | 5.8 | .028 | .037 |
| 105°C | 6.3 | 5.7 | .053 | .176 |
| 120°C | 6.1 | 5.4 | .144 | .507 |
| 135°C | 6.1 | 8.4 | .347 | 1.018 |
| 155°C | 9.7 | — | 1.086 | — |

A specimen of the crosslinked film of this example experienced a weight loss of 17.8% after 2 weeks in a circulating air oven at 200°C. This is an unusually high value, considering the fact that the same heating resulted in so little change in electrical insulating values and in tensile properties.

EXAMPLE 2

The 80% solution in xylene of the linear β-hydroxyester polymer of Example 1 was diluted with methyl ethyl ketone to a concentration of 50% solids and mixed with a 36-carbon aliphatic diisocyanate (e.g., General Mills "Diisocyanate 1410") in a ratio of 10 parts polymer to one part by weight of the crosslinker. This was coated onto 2 mil (50 micron) polyimide film ("Kapton") commonly used for flexible printed circuitry. The coating was dried for 5 minutes at 80°C to a thickness of 1¼ mils (30 microns), and the linear polymer was then crosslinked by heating for 5 minutes at 175°C. The crosslinked coating was joined at 80 psig in a two-roll laminator to 1 ounce/sq. ft. copper foil, which had been treated to provide an oxide surface (Circuit Foil Corp. "Treatment A"). After heating in a circulating air oven at 150°C for 5 minutes, the polyimide film was firmly laminated to the copper.

The laminate was tested for T-peel adhesion (ASTM D-1876-61T) by pulling the copper and the polyimide film in opposite directions at a rate of 10 inches per minute. The T-peel adhesion value was 9.6 pounds per inch width, excellent for flexible printed circuit film. Another portion of the laminate submerged for 30 seconds in a solder bath at 260°C experienced no blistering, and the copper foil remained firmly adhered to the polyimide film.

EXAMPLE 3

A mixture of 911 grams adipic acid (12.5 equivalents), 540 grams of 1,4-butanediol (12 equivalents) and 2.9 grams potassium acetate was heated with stirring in a reaction flask equipped with a nitrogen inlet tube, condenser and a water-collecting trap. The temperature was slowly raised to 215°C while water of esterification was removed over a period of 10 hours. A vacuum of 0.1 mm was applied to remove any remaining volatiles. The resultant polyester had an acid equivalent weight of 1500 and a hydroxyl number of 1.

230.3 grams (0.154 acid equivalent) of this acid-terminated polyester and 26.2 grams (0.150 equivalent) of the diepoxide of Example 1 were heated with sufficient xylene to make a solution containing 90% solids which was heated at reflux (170°–175°C) for about ½ hour while the viscosity increased sufficiently to require dilution with xylene to 75% solids. Refluxing was maintained for an additional ½ hour, after which the reaction was terminated by cooling to room temperature. The resultant linear β-hydroxy-ester polymer had a calculated average of 182 members between adjacent hydroxyl groups in segments of the skeletal chain derived from the polyester.

The solution of the linear polymer was coated on a low-adhesion carrier web and heated at 150°C for 16 hours to provide an opaque film. This was stripped from the carrier web and oriented by stretching at room temperature on an Instron Tensile Tester to 5 times its original length to provide a clear oriented 5 mil (125-micron) film having a tensile strength of 7000 psi and an elongation at break of 100%. When heated to 180°C, the oriented film immediately retracted to its original dimensions. At this point, the film could again be oriented by stretching, but after prolonged exposure to 180°C, it became crosslinked and could no longer be oriented by stretching, although it still was flexible, tough, stretchable and retractable.

EXAMPLE 4

A polyester having an acid equivalent weight of 1200 was prepared from the same ingredients used in Example 3. 180 grams (0.15 equivalent) of this polyester, 26 grams (0.15 equivalent) of the diepoxide of Example 1, and 0.4 gram of potassium phenate were heated at 150°C in a stirred flask for 90 minutes. Stirring then became difficult and the contents were transferred to a glass jar, and heating was continued in an oven at 150°C. After 6 hours in the oven, the resultant linear β-hydroxy-ester polymer had an inherent viscosity of 0.71. It had a calculated average of 146 members between adjacent hydroxyl groups in segments of the skeletal chain derived from the polyester.

The linear polymer was dissolved in tetrahydrofurane and coated onto a low-adhesion carrier web. After drying for 1 hour at 150°C, a self-supporting flexible film of the polymer was stripped from the carrier. The film had a tensile strength of 2000 psi and a break elongation of 255% and was soluble in acetone. After 6 months at 180°C in a circulating air oven, the film was still flexible and tough.

EXAMPLE 5

A carboxyl-terminated polyamide ester was prepared by reacting 208 grams (2.5 equivalents) of isophthalic acid, 182 grams (2.5 equivalents) of adipic acid, 323 grams (3.17 equivalents) of 2,2-dimethyl-3-hydroxypropyl-2,2-dimethyl-3-hydroxypropionate and 30 grams of ethylene diamine to a temperature of 225°C over a period of 12 hours. After vacuum stripping off any remaining volatiles, a dark brown polyamide ester was recovered having an acid equivalent weight of 1170.

230 grams (0.2 equivalent) of this polyamide ester was reacted with 35 grams (0.2 equivalent) of the diepoxide of Example 1 at 150°C for 25 minutes in a stirred flask. This was then poured into a glass container and placed in an oven at 150°C for 4 hours. The resultant linear β-hydroxy-ester polymer had a black, tough, leathery nature. Its inherent viscosity was 0.47, and it had a calculated average of 100 members between adjacent hydroxyl groups in segments of the skeletal chain derived from the linear polyamide ester.

A solution of the linear polymer in acetone was coated on a low-adhesion carrier web and dried with mild heating to provide a 9-mil film. This was then heated for 3 hours at 150°C to an infusible, insoluble crosslinked state. After 6 months in a circulating air oven at 180°C, the film was still flexible, tough and leathery.

A 100-milligram specimen of the film, freshly crosslinked, was subjected to a thermogravimetric analysis test at a heat rise of 5°C per minute in a circulating air oven. The chart recorder indicated a weight loss of 10% was reached at 415°C, and 50% weight loss was reached at 486°C. These are unusually good values for a film of flexible electrical insulating resin.

EXAMPLE 6

A carboxyl-terminated polyester was prepared from 1148.6 grams (11.25 equivalents) of 2,2-dimethyl-3-hydroxypropyl-2,2-dimethyl-3-hydroxypropionate, 1183.1 grams (12.50 equivalents) of azelaic acid, and 1.23 grams of potassium acetate by heating these materials with stirring in a reaction flask up to 230°C over a period of 11½ hours while removing the condensed water. The reaction product was then vacuum stripped of remaining volatiles at this temperature. This polyester had an acid equivalent weight of 1220.

837.6 grams (0.687 equivalent) of this polyester was reacted with 118.5 grams (0.687 equivalent) of the diepoxide of Example 1 at 150°C in a stirred flask for 7½ hours. At this point, stirring became difficult and the polymer was transferred to a pan and heated further for an additional 4½ hours in a 150°C oven. The resultant linear β-hydroxy-ester polymer had an inherent viscosity of 0.39 and a calculated average of 124 members between adjacent hydroxyl groups in segments of the skeletal chain derived from the polyester.

This linear polymer was placed on a 12-inch two-roll rubber mill, and dry mica powder was slowly added. Milling was continued until a homogeneous mass was obtained containing 61% mica by weight.

The milled mass was then extruded into sheet form on a 2½ inch N.R.L. extruder at a screw speed of 21 rpm, feed pressure of 150 psig, head temperature of 105°C, sheet die temperature of 93°C. The die was set at 8–10 mils (200–250 microns) to provide an extruded film of 13–14 mils in thickness. This film was tested as extruded and also after crosslinking by heating for 15 minutes at 100°C plus 60 minutes at 220°C. Results were:

|  | Film as extruded | Crosslinked film |
| --- | --- | --- |
| Hardness (Shore A) | 6–8 | 15 |
| Tensile strength | 43 psi | 91 psi |
| Elongation | 20% at 43 psi | 20% at 91 psi |
|  | 100% at break | 200% at break |
| Dielectric strength (at 100 cycles) | 580 volts/mil | 680 volts/mil |

A specimen of the crosslinked film held for 96 hours in a circulating air oven at 230°C turned dark brown and became somewhat less flexible, but still could be wound on a mandrel 3 inches in diameter without breaking.

Some of the extruded film of this example was joined upon extrusion to a fibrous web at a two-roll laminator, and the resulting laminate was heated for 15 minutes at 100°C followed by 60 minutes at 220°C to crosslink the linear polymer. One fibrous web was woven glass cloth of 1.7 mil thickness (number 107). Another fibrous web was a 2 mil-thick paper consisting of polyamide resin fibers ("Nomex"). Tests on these fiber-reinforced films yielded the following data:

|  | Crosslinked Film reinforced with glass cloth | Crosslinked Film reinforced with polyamide paper |
| --- | --- | --- |
| Tensile strength | 2500 psi | 1540 psi |
| Elongation at break | 5% | 10% |
| Dielectric strength | 580 volts/mil | 740 volts/mil |

EXAMPLE 7

909 grams (1 equivalent) of carboxyl-terminated polyisobutylene polymer (Enjay Chemical Company "EMD-590") was heated with 174 grams (1 equivalent) of the diepoxide of Example 1 and 1.0 gram of potassium acetate in a stirred reactor at 150°C for 40 minutes and then transferred to a pan and the reaction continued in a 150°C oven for 9 hours. The resultant linear β-hydroxy-ester polymer had an inherent viscosity measured in methylene chloride of 0.27, an acid equivalent weight of 24,700, an epoxide equivalent weight of 42,300 and a hydroxyl number of 54. Segments of the linear polymer derived from the polyisobutylene polymer had a calculated average of about 68 members between adjacent hydroxyl groups.

This linear polymer was dissolved to a 40% solution in toluene and coated onto biaxially-oriented polyethylene terephthalate film. The coating was dried to 1-mil thickness at 60°C in a vacuum oven for 4 hours. Because the coating was highly tacky to the touch, the coated film provided a pressure-sensitive adhesive tape which was adhered by its own adhesive to a polished steel plate and tested for adhesion at 180° (ASTM D-1000-64, Method A). The peelback adhesion was 41 ounces per inch of width.

EXAMPLE 8

1354 grams (14.3 equivalents) of azelaic acid and 679 grams (13.04 equivalents) of neopentyl glycol were condensed with 1.24 grams of potassium acetate catalyst by a process similar to that of Example 3 to provide an acid-terminated polyester having an acid equivalent weight of 1280.

256 grams (0.2 equivalent) of this polyester and 31.4 grams (0.2 equivalent) of 2-(3,4-epoxy)cyclohexyl-5,5-spiro(3,4-epoxy)cyclohexane-m-dioxane were heated with stirring for 31 hours at 150°C. The resultant linear β-hydroxy-ester polymer had an inherent viscosity of 0.22, an epoxide equivalent of 54,200, an acid equivalent of 19,000 and a hydroxyl number of 47.4. It had a calculated average of 142 members between adjacent hydroxyl groups in segments of the skeletal chain derived from the polyester.

35.6 grams of the linear polymer were dissolved in 23.7 grams of a mixture of equal parts by weight of toluene and methyl ethyl ketone, and to the solution was added 2.6 grams of toluene diisocyanate. This was coated on a low-adhesion carrier web and dried for 2½ days at room temperature. Preferably the coating should have been dried by heating to insure against reaction of the isocyanate with moisture in the air.

The resultant 8 mil film was heated for 30 minutes at 100°C followed by 15 minutes at 175°C, and then a ½ inch strip was tested on the Instron Tensile Tester at an initial jaw separation of 1 inch and at a rate of 2 inches per minute. Tensile strength was 275 psi. Elongation at break was 125%.

EXAMPLE 9

473.3 grams (5.0 equivalents) of azelaic acid and 208.3 grams (4.0 equivalents) of neopentyl glycol were condensed with 0.98 gram of potassium acetate catalyst by a process similar to that of Example 3 to provide an acid-terminated polyester having an acid equivalent weight of 575. 575 grams (1.0 equivalent) of this polyester and 350 grams (2.0 equivalents) of the diepoxide of Example 1 were heated with stirring for 3½ hours at 140°C and then cooled to room temperature. The resultant epoxy-terminated pre-polymer had an acid number of 0.4 and an epoxide equivalent weight of 939. Such a pre-polymer is disclosed in Groff U.S. Pat. No. 3,576,903.

281.7 grams of this pre-polymer and 13.9 grams (0.3 equivalent) of aniline were heated with stirring at 120°C for 6 hours. The viscosity became quite high, so this was poured into a container and allowed to cool. The tough, rubbery solid product was a linear polymer containing both β-hydroxyester and β-hydroxy-amine linkages and had an inherent viscosity of 0.36. Segments of the skeletal chain of the linear polymer derived from the polyester had a calculated average of 65 members between adjacent hydroxyl groups.

A portion of the linear polymer which was essentially solvent-free gelled in 2 weeks, apparently having crosslinked in that period substantially to an infusible, insoluble state. On the other hand, a 40% solution of the linear polymer in methyl ethyl ketone did not appreciably advance in viscosity on standing, indicating that the linear polymer of this example does not autogenously crosslink in solution at room temperature.

This 40% solution was mixed with 1.0 gram of methylcyclohexylenediisocyanate, coated on a low-adhesion carrier web and dried at 60°C for ½ hour. The dried 2-mil-thick film was crosslinked by heating at 150°C for 1 hour plus 180°C for 15 minutes. The crosslinked film after being stripped from the carrier web exhibited a tensile strength of 4100 psi and an elongation at break of 190% when tested as in Example 1.

Another portion of this linear β-hydroxy-ester/amide polymer was coated on 0.8 mil copper foil (treated to have an oxide surface) and dried at 60°C for ½ hour to a thickness of 2 mils. The coating was placed against another sheet of the copper foil in a 200°C press for ½ hour to provide a laminate having a T-peel test value of 7.5 pounds per inch (tested as in Example 2).

Another piece of the copper foil having a 2-mil coating of the linear polymer after drying at room temperature overnight was laminated to a 0.8 mil polyimide film ("Kapton") in a 200°C heated platen press for 1 hour. This laminate had a T-peel test value of 6.5 pounds per inch. When dipped in a solder bath for 30 seconds at 260°C, the laminate showed no evidence of blistering or of decreased adhesion between the copper and the polyimide film.

EXAMPLE 10

22.0 grams (0.4 equivalent) of hydroquinone was added to a reaction flask containing 262.4 grams (0.4 equivalent) of an epoxy-terminated pre-polymer which was the same as the pre-polymer described in Example 9 except that its epoxide equivalent weight was 656. This was heated to 110°C, and 0.71 gram of benzyldimethylamine was added. The temperature was held between 110° and 115°C for 75 minutes, by which point the viscosity has become very high. The reaction mixture was dissolved in a 50/50 mixture of toluene and methyl ethyl ketone to 60% solids. This was heated at a reflux temperature of 105°C for eight hours. Solvent was evaporated from a portion of the product at 60°C and 0.1 mm Hg to provide a dried linear polymer having both β-hydroxy-ester and β-hydroxy-ether groups. It had a calculated average of approximately 54 members between adjacent hydroxyl groups. Inherent viscosity was 0.4 measured in methylene dichloride.

Another portion of the solution was coated on a low-adhesion carrier web, dried overnight at room temperature and heated for 1 hour at 150°C to provide a crosslinked film which was soft and stretchy. It had a tensile strength of 450 psi and an elongation at break of 560%, measured as in Example 1.

EXAMPLE 11

A linear β-hydroxy-amine polymer was prepared using a dimer fat acid obtained by polymerizing $C_{18}$ unsaturated fatty acids. The dimer fat acid had a dimer content ($C_{36}$) of 97% and a trimer content ($C_{54}$) of 3%. Such a dimer fat acid is marketed as "Empol 1010". 291 grams (0.5 equivalent) of the dimer fat acid in a 58% solution in xylene was added incrementally to 106 grams (1.0 equivalent) of 1,3di-4-piperidylpropane in a 55% solution in xylene while the temperature was being raised to reflux. Then the condensation water and xylene were removed over a period of 4 hours, with the temperature slowly rising to 211°C. A 10 mm Hg vacuum was applied for 30 minutes at this temperature to strip out any remaining volatiles. The resultant sec-amine-terminated polyamide had an amine equivalent of 500.

To 260 grams (0.52 equivalent) of the polyamide was incrementally added 88.5 grams (0.5 equivalent) of the diepoxide of Example 1. An exotherm gradually raised the temperature to 63°C during the 40-minute addition period. Stirring was continued for an additional 10 minutes while heat was applied to raise the temperature to 71°C. This was poured into a pan and heated in a circulating air oven for 2 hours at 80°C. The resultant linear β-hydroxy-amine polymer was soluble and had an inherent viscosity of 0.46 (measured in methylene dichloride), a hydroxyl number of 90 and a calculated average of about 48 members between adjacent hydroxyl groups in segments of the skeletal chain derived from the polyamide.

A portion of this polymer was dissolved to 35% solids in a 50/50 toluene/methylene dichloride mixture. Part of this solution was coated out on a low-adhesion carrier web and air dried overnight followed by heating for 1 hour at 150°C. The 3.5 mil film thus obtained had a tensile strength of 2860 psi and an elongation at break of 330%.

To another part of this solution was added 10% (based on polymer solids) of methylcyclohexylenediisocyanate. A coating of this on a low-adhesion carrier web was air dried for 4 hours and then heated for 30 minutes at 150°C. The resultant crosslinked 1.0 mil film had a tensile strength of 5200 psi and an elongation at break of 100%.

In addition to uses illustrated by the examples, the linear polymer of this invention in general has utility wherever flexible electrical insulating resin is required. For example, it is useful as a substitute for electrical insulating varnish. In addition, the linear polymer can be used where electrical insulating values are unimportant, e.g., extruded products of various kinds and shapes.

I claim:

1. A flexible, soluble, fusible, primarily aliphatic linear polymer containing recurring β-hydroxy-ester, β-hydroxy-ether and/or β-hydroxy-amine linkages in its skeletal chain, some segments of which include at least 20 members between adjacent hydroxyl groups, counting as one member each ring and each atom of any linear chain in the segment and excluding the carbons to which the hydroxyls are attached, said polymer having an inherent viscosity of at least 0.2, a hydroxyl number of about 25–250, and being substantially free from ethylenic unsaturation in the skeletal chain and from oxirane oxygen and active hydrogen other than in its hydroxyl groups through which it can be crosslinked to an insoluble, infusible, still flexible, heat-resistant, state, and any ether oxygens in the skeletal chain are substantially all attached to cyclic carbon.

2. A linear polymer as defined in claim 1 having an inherent viscosity of more than 0.3.

3. An infusible, insoluble product obtained by crosslinking the linear polymer defined in claim 1.

4. A composition of matter comprising a mixture of a polymer as defined in claim 1 with an organic polyfunctional crosslinking agent containing at least two groups reactive with hydroxyl.

5. The crosslinked product of the composition defined in claim 4.

6. A linear polymer as defined in claim 1 modified by the reaction of at least some of its hydroxyl groups with a monofunctional organic compound.

7. A thin, flexible, stretchable, retractable film formed from a linear polymer as defined in claim 1.

* * * * *